(12) United States Patent
Chen et al.

(10) Patent No.: US 11,886,928 B2
(45) Date of Patent: Jan. 30, 2024

(54) AUTOMATED SERVICE TIERING BETWEEN EDGE COMPUTING SITES AND A CORE DATA CENTER

(71) Applicant: Dell Products L.P., Round Rock, TX (US)

(72) Inventors: Chi Chen, Chengdu (CN); Hailan Dong, Chengdu (CN); Changyue Dai, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 439 days.

(21) Appl. No.: 17/371,406

(22) Filed: Jul. 9, 2021

(65) Prior Publication Data
US 2022/0398136 A1 Dec. 15, 2022

(30) Foreign Application Priority Data
Jun. 11, 2021 (CN) .......................... 202110658172.8

(51) Int. Cl.
*G06F 9/50* (2006.01)

(52) U.S. Cl.
CPC .......... *G06F 9/5077* (2013.01); *G06F 9/5044* (2013.01); *G06F 9/5072* (2013.01)

(58) Field of Classification Search
CPC .... G06F 9/5077; G06F 9/5044; G06F 9/5072; G06F 9/5088; G06F 9/4881; G06F 2209/502; G06N 3/06; G06N 3/10
See application file for complete search history.

(56) References Cited

U.S. PATENT DOCUMENTS

| | | | | |
|---|---|---|---|---|
| 11,671,505 B2* | 6/2023 | Smith | ..................... | H04L 67/34 709/224 |
| 2018/0300124 A1* | 10/2018 | Malladi | ................. | H04L 12/283 |
| 2020/0320397 A1* | 10/2020 | Liu | .......................... | H04L 67/34 |
| 2020/0327371 A1* | 10/2020 | Sharma | ..................... | G06N 3/08 |
| 2022/0179683 A1* | 6/2022 | Verma | .................. | H04L 43/045 |

OTHER PUBLICATIONS

S. Ranganathan, "Edge to Core to Cloud Architecture for AI," Technical White Paper, Net App, Aug. 2018, 13 pages.
Y. Zhu et al., "Effectiveness of Entropy Weight Method in Decision-Making," Hindawi, Mathematical Problems in Engineering, vol. 2020, No. 3564835, Mar. 26, 2020, 5 pages.

* cited by examiner

*Primary Examiner* — Sisley N Kim
(74) *Attorney, Agent, or Firm* — Ryan, Mason & Lewis, LLP (57) ABSTRACT

An apparatus comprises a processing device configured to obtain information associated with services hosted in an information technology infrastructure comprising a core data center hosting a first subset of the services and edge computing sites hosting a second subset of the services. The processing device is also configured to determine, based on the obtained information, values associated with parameters characterizing suitability of hosting respective ones of the services at the computing sites, and to generate, based on the determined values, scores for each of the services. The processing device is further configured to identify, based on the generated scores, at least a given one of the services to be migrated from the core data center to the edge computing devices or from the edge computing sites to the core data center. The processing device is further configured to migrate the given one of the services.

20 Claims, 9 Drawing Sheets

AUTOMATED SERVICE TIERING BETWEEN EDGE COMPUTING SITES AND A CORE DATA CENTER

RELATED APPLICATION

The present application claims priority to Chinese Patent Application No. 202110658172.8, filed on Jun. 11, 2021 and entitled "Automated Service Tiering Between Edge Computing Sites and a Core Data Center," which is incorporated by reference herein in its entirety.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for automated service tiering between edge computing sites and a core data center.

In one embodiment, an apparatus comprises at least one processing device comprising a processor coupled to a memory. The at least one processing device is configured to perform the step of obtaining information associated with a plurality of services hosted in an information technology infrastructure, the information technology infrastructure comprising at least one core data center hosting a first subset of the plurality of services and one or more edge computing sites hosting a second subset of the plurality of services. The at least one processing device is also configured to perform steps of determining, based at least in part on the obtained information, values associated with two or more parameters characterizing suitability of hosting respective ones of the plurality of services at the one or more edge computing sites and generating, based at least in part on the determined values associated with the two or more parameters characterizing suitability of hosting respective ones of the plurality of services at the one or more edge computing sites, scores for each of the plurality of services. The at least one processing device is further configured to perform the step of identifying, based at least in part on the generated scores for the plurality of services, at least a given one of the plurality of services to be migrated, wherein the given one of the plurality of services to be migrated comprises one of: one of the first subset of the plurality of services to be migrated from the at least one core data center to at least one of the one or more edge computing sites; and one of the second subset of the plurality of services to be migrated from the one or more edge computing sites to the at least one core data center. The at least one processing device is further configured to perform the step of migrating the given one of the plurality of services.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
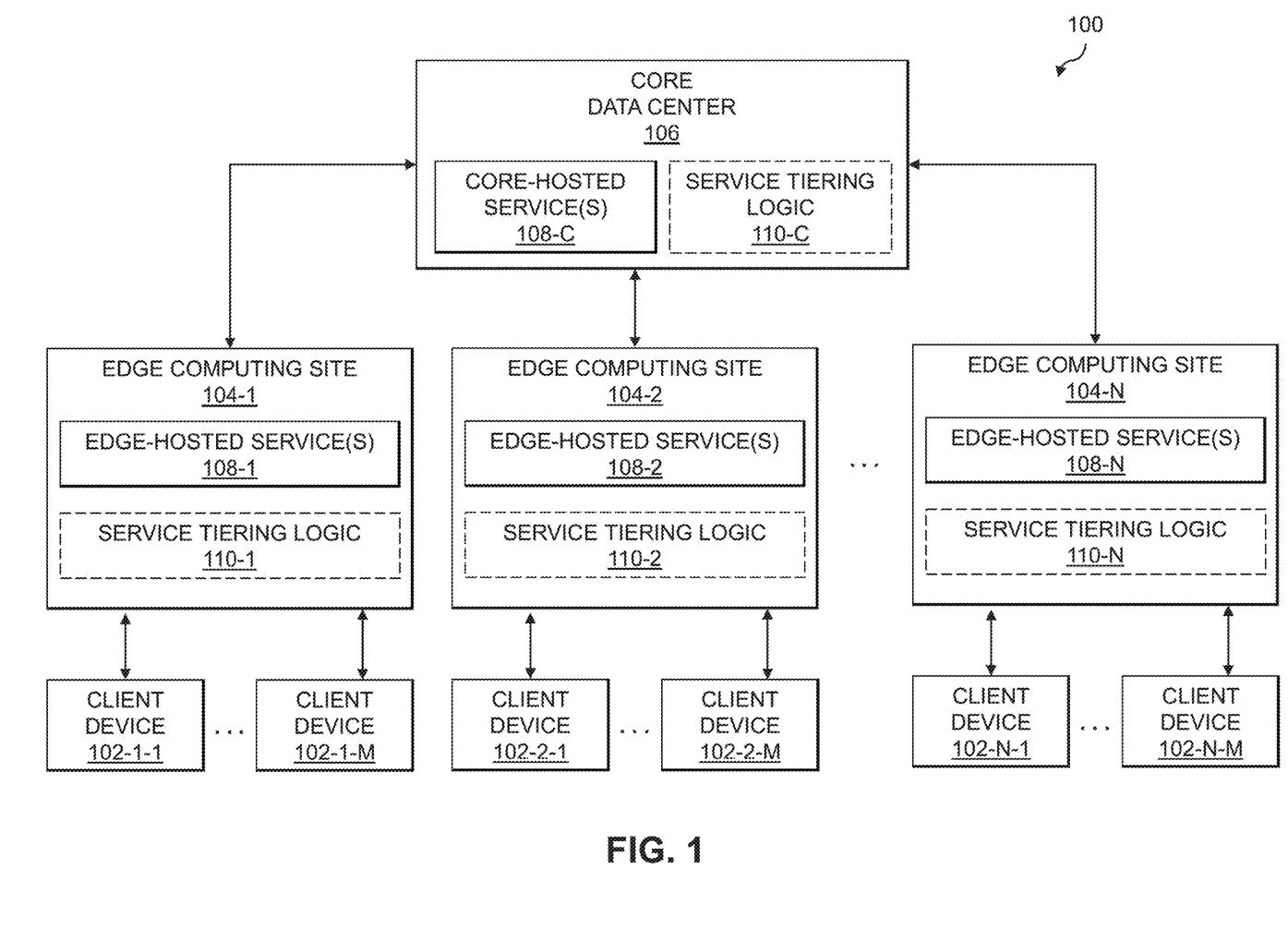
FIG. 1 is a block diagram of an information processing system configured for automated service tiering between edge computing sites and a core data center in an illustrative embodiment.

FIG. 1 shows an information processing system 100 configured in accordance with an illustrative embodiment. The information processing system 100 is assumed to be built on at least one processing platform and provides functionality for automated tiering of services between edge computing sites 104-1, 104-2, . . . 104-N (collectively, edge computing sites 104) and a core data center 106. As used herein, the term "services" is intended to be broadly construed to include applications, microservices, and other types of services. Each of the edge computing sites 104 is assumed to comprise a plurality of edge devices or edge nodes (not shown in FIG. 1) that run edge-hosted services 108-1, 108-2, . . . 108-N (collectively, edge-hosted services 108-E). The core data center 106 is also assumed to comprise a plurality of core devices or core nodes (not shown in FIG. 1) that run core-hosted services 108-C. The edge-hosted services 108-E and core-hosted services 108-C are collectively referred to as services 108.

The information processing system 100 includes a plurality of client devices that are coupled to each of the edge computing sites 104. A set of client devices 102-1-1, . . . 102-1-M (collectively, client devices 102-1) are coupled to edge computing site 104-1, a set of client devices 102-2-1, . . . 102-2-M (collectively, client devices 102-2) are coupled to edge computing site 104-2, and a set of client devices 102-N-1, . . . 102-N-M (collectively, client devices 102-N) are coupled to edge computing site 104-N. The client devices 102-1, 102-2, . . . 102-N are collectively referred to as client devices 102. It should be appreciated that the particular number "M" of client devices 102 that are connected to each of the edge computing sites 104 may be different. In other words, the number M of client devices 102-1 coupled to the edge computing site 104-1 may be the same as or different than the number M of client devices 102-2 coupled to the edge computing site 104-2. Further, a particular client device 102 may be connected or coupled to only a single one of the edge computing sites 104 at any given time, or may be coupled to multiple ones of the edge computing sites 104 at any given time, or may be connected to different ones of the edge computing sites 104 at different times.

The client devices 102 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as virtual machines (VMs), containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The networks coupling the client devices 102, the edge computing sites 104 and the core data center 106 are assumed to comprise a global computer network such as the Internet, although other types of networks can be part of the core data center 106, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the client devices 102 to the edge computing sites 104, while a second type of network (e.g., a private network) couples the edge computing sites 104 to the core data center 106.

In some embodiments, the edge computing sites 104 and core data center 106 collectively provide at least a portion of an information technology (IT) infrastructure operated by an enterprise, where the client devices 102 are operated by users of the enterprise. The IT infrastructure comprising the edge computing sites 104 and the core data center 106 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the core data center 106 and/or the edge computing sites 104. A given enterprise system may host assets that are associated with multiple enterprises (e.g., two or more different businesses, organizations or other entities).

Although not explicitly shown in FIG. 1, one or more input-output devices such as keyboards, displays or other types of input-output devices may be used to support one or more user interfaces to the edge computing sites 104 and the core data center 106, as well as to support communication between the edge computing sites 104, the core data center 106 and other related systems and devices not explicitly shown.

As noted above, the edge computing sites host edge-hosted services 108-E and the core data center 106 hosts core-hosted services 108-C, where the edge-hosted services 108-E and the core-hosted services 108-C are collectively referred to as services 108. The client devices 102 send requests for accessing the services 108 to the edge computing sites 104 (e.g., to edge computing devices or edge nodes thereof). If a given request from one of the client devices 102 (e.g., client device 102-1-1) is directed to one of the edge-hosted services 108-1 at the edge computing site 104-1, edge computing devices or edge nodes at the edge computing site 104-1 will service the given request and provide a response (if applicable) to the requesting client device 102-1-1. If the given request is directed to one of the core-hosted services 108-C, the edge computing devices or edge nodes at the edge computing site 104-1 will forward the given request to the core data center 106. The core data center 106 will service the given request, and provide a response (if applicable) back to the edge computing site 104-1, which will in turn provide the response back to the requesting client device 102-1-1.

Different ones of the services 108 may have different required performance or other characteristics. As a result, it may be more advantageous for certain ones of the services 108 to be hosted at the edge computing sites 104 or the core data center 106, based on the required performance or other characteristics of the services 108. Further, the required performance or other characteristics of the services 108 may change over time, such that a given service currently hosted on one of the edge computing sites 104 may be better suited for hosting by the core data center 106, or vice versa. In illustrative embodiments, the edge computing devices 104 and the core data center 106 implement respective instances of service tiering logic 110-1, 110-2, . . . 110-N and 110-C (collectively, service tiering logic 110). The service tiering logic 110 provides for dynamic promotion of different ones of the services 108 at the edge computing sites 104 and the core data center 106 to meet the desired performance or other characteristics of the services 108.

The service tiering logic 110 is configured to obtain information associated with the services 108 hosted in the IT infrastructure comprising the edge computing sites 104 and the core data center 106, and to determine based on such obtained information values associated with two or more parameters (e.g., tolerable latency, bandwidth requirements, numbers of access requests) characterizing suitability of hosting respective ones of the services 108 at the edge computing sites 104. The service tiering logic 110 is further configured to generate, based at least in part on the determined values associated with the two or more parameters characterizing suitability of hosting respective ones of the services 108 at the edge computing sites 104, scores for each of the plurality of services. The service tiering logic 110 utilizes such generated scores to identify ones of the services 108 to be migrated (e.g., from the edge computing sites 104 to the core data center 106, or vice versa), and then migrates such services 108. The service tiering logic 110 may perform the above functionality for each of multiple service relocation cycles (e.g., based on updated information associated with operation of the services 108 in the IT infrastructure comprising the edge computing sites 104 and the core data center 106).

In some embodiments, information associated with the services 108 (e.g., status information, parameters derived from or otherwise determined based on the status information) may be stored in a database or other data store. The database or other data store may be implemented using one or more of storage systems that are part of or otherwise associated with one or more of the client devices 102, the edge computing sites 104, the core data center 106. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the edge computing sites 104 and the core data center 106 in this embodiment, the service tiering logic 110 in other embodiments can be implemented at least in part externally to the edge computing sites 104 and the core data center 106, for example, as a stand-alone server, set of servers or other type of system coupled via one or more networks to the edge computing sites 104 and/or the core data center 106. In some embodiments, the service tiering logic 110 may be implemented at least in part within one or more of the client devices 102.

The edge computing sites 104 and the core data center 106 in the FIG. 1 embodiment are assumed to be implemented using at least one processing device. Each such processing device generally comprises at least one processor and an associated memory, and implements at least a portion of the functionality of the service tiering logic 110.

It is to be appreciated that the particular arrangement of the client devices 102, the edge computing sites 104, the core data center 106, services 108 and service tiering logic 110 illustrated in the FIG. 1 embodiment is presented by way of example only, and alternative arrangements can be used in other embodiments. As discussed above, for example, the service tiering logic 110 may be implemented external to one or both of the edge computing sites 104 and the core data center 106. At least portions of the service tiering logic 110 may be implemented at least in part in the form of software that is stored in memory and executed by a processor.

It is to be understood that the particular set of elements shown in FIG. 1 for automated service tiering between the edge computing sites 104 and the core data center 106 is presented by way of illustrative example only, and in other embodiments additional or alternative elements may be used. Thus, another embodiment may include additional or alternative systems, devices and other network entities, as well as different arrangements of modules and other components.

The client devices 102, the edge computing sites 104, the core data center 106 and other portions of the system 100, as will be described above and in further detail below, may be part of cloud infrastructure.

The client devices 102, the edge computing sites 104, the core data center 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the edge computing sites 104, and the core data center 106, or components thereof, may be implemented on respective distinct processing platforms, although numerous other arrangements are possible. For example, in some embodiments at least portions of the edge computing sites 104 and the core data center 106 are implemented on the same processing platform. One or more of the client devices 102 can therefore be implemented at least in part within at least one processing platform that implements at least a portion of the edge computing sites 104 and/or the core data center 106.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the edge computing sites 104 and the core data center 106, or portions or components thereof, to reside in different data centers. Numerous other distributed implementations are possible.

Additional examples of processing platforms utilized to implement the client devices 102, the edge computing sites 104 and the core data center 106 and other components of the system 100 in illustrative embodiments will be described in more detail below in conjunction with FIGS. 7 and 8.

It is to be appreciated that these and other features of illustrative embodiments are presented by way of example only, and should not be construed as limiting in any way.

Figure 2:
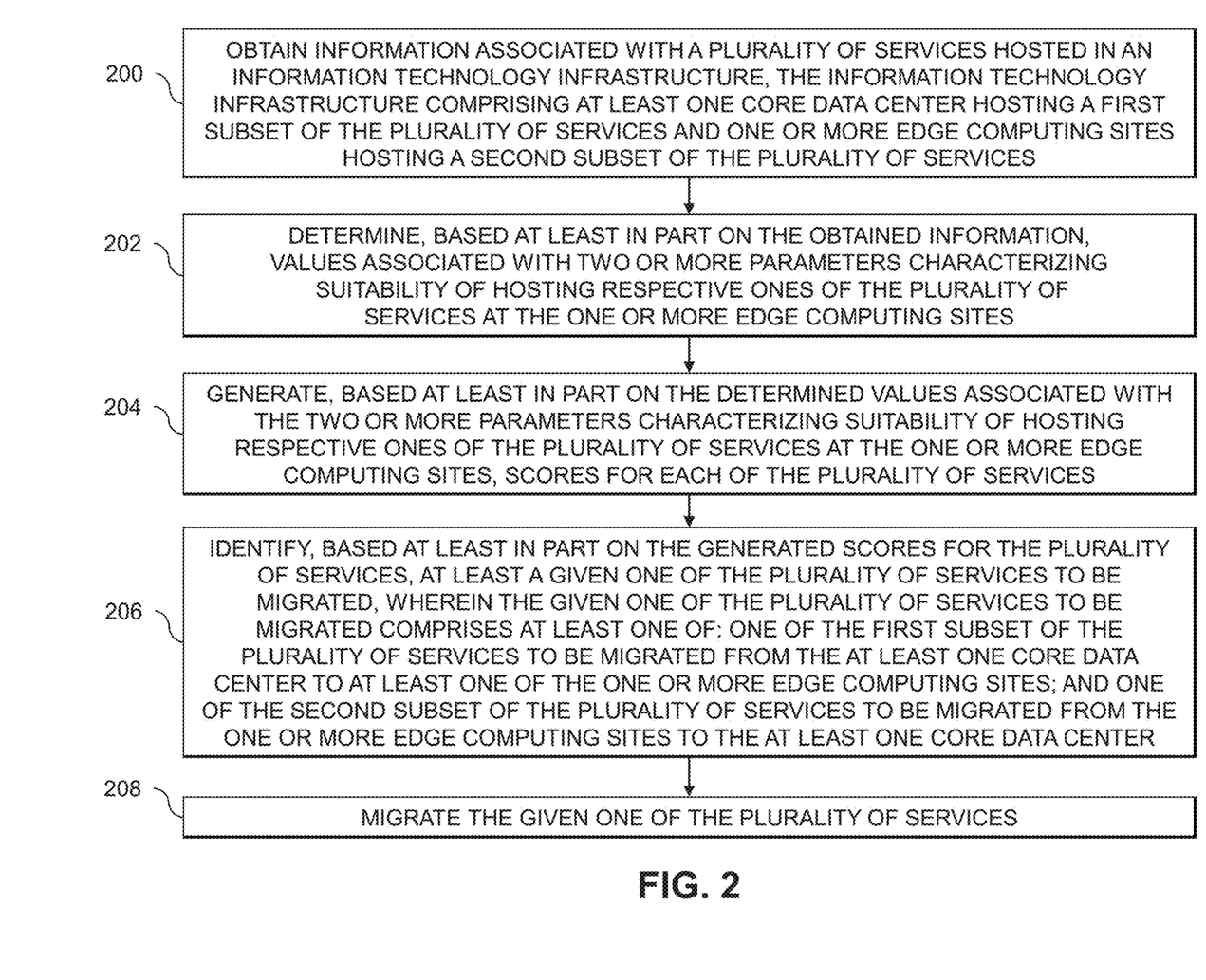
FIG. 2 is a flow diagram of an exemplary process for automated service tiering between edge computing sites and a core data center in an illustrative embodiment.

An exemplary process for automated service tiering between edge computing sites and a core data center will now be described in more detail with reference to the flow diagram of FIG. 2. It is to be understood that this particular process is only an example, and that additional or alternative processes for automated service tiering between edge computing sites and a core data center may be used in other embodiments.

In this embodiment, the process includes steps 200 through 208. These steps are assumed to be performed by the edge computing sites 104 and the core data center 106 utilizing the service tiering logic 110. The process begins with step 200, obtaining information associated with a plurality of services hosted in an information technology infrastructure, the information technology infrastructure comprising at least one core data center (e.g., core data center 106) hosting a first subset of the plurality of services (e.g., core-hosted services 108-C) and one or more edge computing sites (e.g., edge computing sites 104) hosting a second subset of the plurality of services (e.g., edge-hosted services 108-1, 108-2, . . . 108-N). The at least one core data center may be geographically remote from the one or more edge computing sites.

In step 202, values associated with two or more parameters characterizing suitability of hosting respective ones of the plurality of services at the one or more edge computing sites are determined based at least in part on the obtained information. The two or more parameters characterizing suitability of hosting respective ones of the plurality of services at the one or more edge computing sites may comprise: at least one parameter characterizing tolerable latency for respective ones of the plurality of services; at least one parameter characterizing bandwidth requirements for respective ones of the plurality of services; and at least one parameter characterizing numbers of access requests for respective ones of the plurality of services.

Scores for each of the plurality of services are generated in step 204, based at least in part on the determined values associated with the two or more parameters characterizing suitability of hosting respective ones of the plurality of services at the one or more edge computing sites, scores for each of the plurality of services. Step 204 may include standardizing values of each of the two or more parameters, where standardizing the values of each of the two or more parameters may comprise normalizing values for the parameters to some designated range. Step 204 may also include calculating weights for each of the two or more parameters, which may utilize an entropy weighting method (EWM). Step 204 may further include generating the scores as weighted combinations of the standardized values of the two or more parameters for the plurality of services.

In step 206, at least a given one of the plurality of services to be migrated are identified based at least in part on the generated scores for the plurality of services. The given one of the plurality of services to be migrated comprises one of: one of the first subset of the plurality of services to be migrated from the at least one core data center to at least one of the one or more edge computing sites; and one of the second subset of the plurality of services to be migrated from the one or more edge computing sites to the at least one core data center. Step 206 may comprise determining available resources at the one or more edge computing sites, and identifying, based at least in part on the determined available resources, a maximum number of the plurality of services that can be concurrently hosted at the one or more edge computing sites. Step 206 may further comprise: determining whether a total number of the plurality of services receiving access requests in a first service relocation cycle is less than or equal to the maximum number of the plurality of services that can be concurrently hosted at the one or more edge computing sites; hosting, for a second service relocation cycle subsequent to the first service relocation cycle, all of the plurality of services at the one or more edge computing sites responsive to determining that the total number of the plurality of services receiving access requests in the first service relocation cycle is less than or equal to the maximum number of the plurality of services that can be concurrently hosted at the one or more edge computing sites; and hosting, for the second service relocation cycle, a selected subset of the plurality of services at the one or more edge computing sites responsive to determining that the total number of the plurality of services receiving access requests in the first service relocation cycle is greater than the maximum number of the plurality of services that can be concurrently hosted at the one or more edge computing sites.

The given one of the plurality of services is migrated in step 208. At least one of the one or more edge computing sites may store an image for the given one of the plurality of services, the image for the given one of the plurality of services comprising at least one of a virtual machine image and a software container image. Step 208 may comprise migrating the given one of the plurality of services from the at least one data center to said at least one of the one or more edge computing sites by instantiating at least one of a virtual machine instance and a software container instance utilizing the image stored by said at least one of the one or more edge computing sites. Thus, in some embodiments, migrating services from the core data center to the edge computing sites, or vice versa, does not incur any significant performance penalty as virtual machine or software container images for the services may be stored at both the core data center and the edge computing sites such that migrating services requires only activation or instantiation of such images in virtual machine or software container instances.

As described above, in some embodiments an automatic tiering mechanism is utilized to move services between an edge site and a core data center. The automatic tiering mechanism illustratively enables dynamic promotion of services that have certain characteristics or requirements (e.g., low latency, frequent requests, etc.) to edge sites, and enables dynamic promotion of services that have other characteristics or requirements (e.g., delay-insensitive services, etc.) to the core data center.

Figure 3:
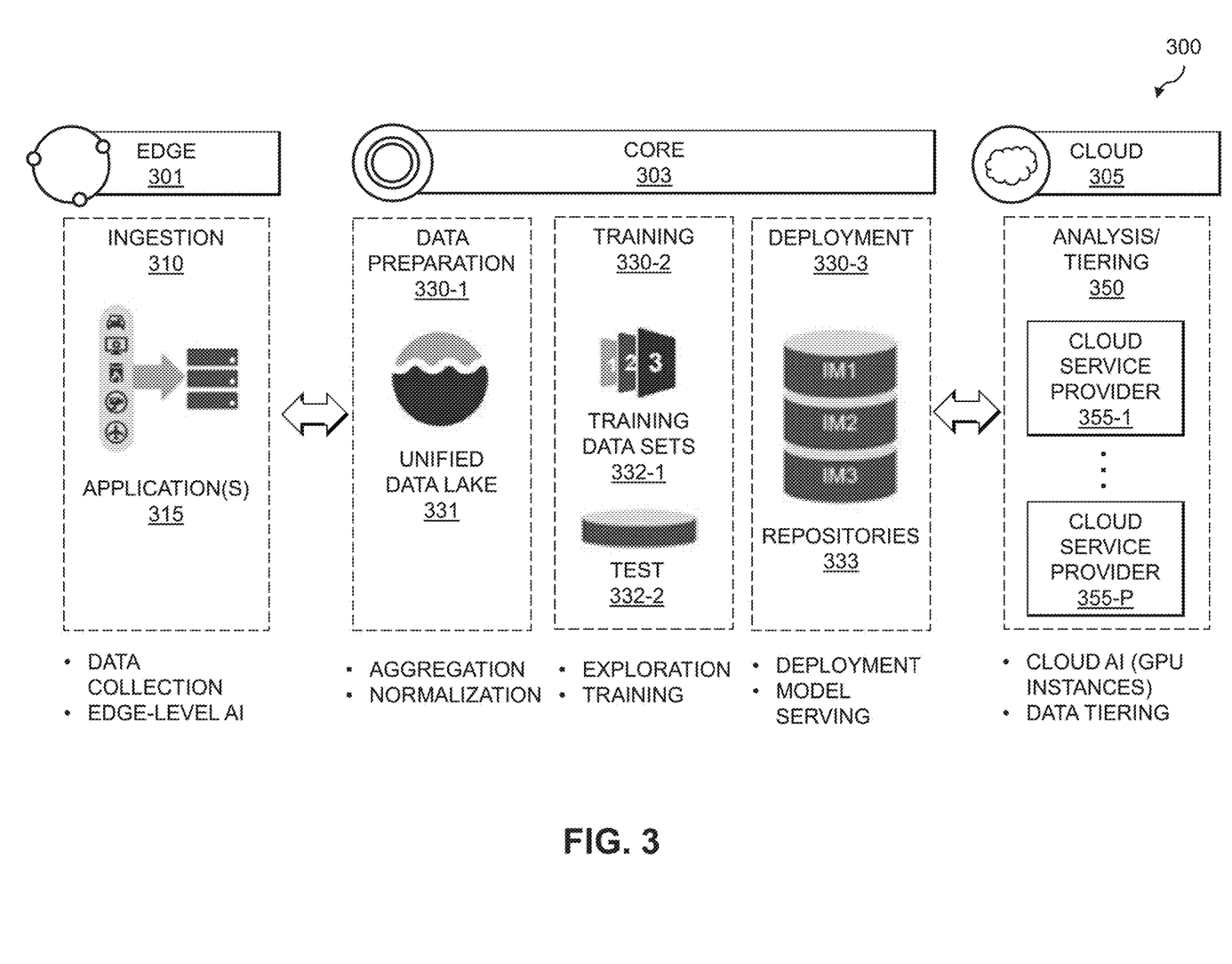
FIG. 3 shows a deep learning model deployment across edge, core and cloud computing sites in an illustrative embodiment.

FIG. 3 shows an architecture 300 of an end-to-end deep learning model deployment across three stages, an edge stage 301, a core stage 303 and a cloud stage 305. A deep learning model or engine may be used for various tasks, including but not limited to detection of fraud, improving customer relationships, optimizing supply chains, etc. The performance and accuracy of deep learning models may be significantly improved by increasing the size and complexity of the neural network that is utilized, and by increasing the amount and quality of data used to train the deep learning models. The architecture 300 shown in FIG. 3 can advantageously offer flexibility for deployment across environments (e.g., edge devices in the edge stage 301, a core data center in the core stage 303, and cloud computing environments in the cloud stage 305).

At the edge stage 301, data ingestion 310 is performed. Data ingestion 310 includes data collection from applications 315, as well as edge-level artificial intelligence (AI) tasks. Data ingestion 310 may include capturing data streaming from the applications 315.

At the core stage 303, data preparation 330-1, training 330-2 and deployment 330-3 are performed. Data preparation 330-1 includes various preprocessing tasks, such as aggregation, normalization, etc. that is needed to cleanse or otherwise prepare the data prior to training 330-2. Such preprocessing tasks may be performed in or using a unified data lake 331. The unified data lake 331 may be cloud-implemented, or may use on-premise storage systems within a core data center. In some embodiments, the unified data lake 331 includes a file store or an object store. Training 330-2 includes exploration and training of the deep learning model. To do so, data may be copied from the unified data lake 331 into a training cluster at regular intervals to form training data sets 332-1 which are then tested 332-2 or validated. Servers performing the testing 332-2 may utilize graphic processing units (GPUs) for parallelizing computations. Deployment 330-3 includes deploying the deep learning model (trained and tested during training 330-2) into production. The trained and tested deep learning model may also or alternatively be fed back to the unified data lake 331 for adjustments (e.g., of input weights, etc.). In some embodiments, the trained and tested deep learning model may be deployed to edge devices (e.g., for IoT applications).

At the cloud stage 305, analysis and tiering 350 are performed. Various cloud service providers (CSPs) 355-1, . . . 355-P (collectively, CSPs 355) may implement clouds on which various cloud-based tools run for performing cloud-based AI tasks (e.g., including cloud-based AI tasks that utilize GPU instances). The CSPs may also implement clouds providing data tiering functionality. Thus, additional analysis and development work may be conducted by the CSPs 355. Further, cold data may be archived to cloud-based storage in private and public clouds of the CSPs 355.

Edge computing includes offering applications 315 or other services (e.g., including an IT service environment that includes the applications 315) at the edge of a network. An edge site usually has some capabilities, such as application integration and methods for addressing applications with strict low latency requirements (e.g., self-driving applications, augmented reality (AR), virtual reality (VR), voice, etc.). An aim of edge computing is to move computations away from data centers (e.g., the core data center at core stage 303) towards the edge of the network (e.g., edge devices at the edge stage 301). This advantageously brings computation and data storage closer to the client devices where data is being gathered rather than relying on a central location (e.g., the core data center) that can be a long distance away (e.g., thousands of miles away). Thus, edge computing provides various benefits such as reducing latency and mitigating bandwidth limits. Reducing latency includes providing latency to end users that is lower than it would be if the computations were performed farther away (e.g., at the core data center rather than at the edge devices). Low latency may be required for many tasks, including but not limited to self-driving, AR/VR, voice, gaming, etc. The ability to move workloads closer to the end users or data collection points also reduces the effect of limited bandwidth at an edge site. This is especially useful if a given application or other service requires transmission of large amounts of data for processing. By running the given application or other service on an edge device or node at an edge site, significant bandwidth savings are achieved by avoiding transmission of or reducing the amount of data required to be transmitted to a core data center. This provides various cost savings (e.g., in terms of bandwidth or other network resources required for transporting data over long distances between an edge site and a core data center).

At an edge site, there may be many different types of edge devices or nodes, as well as many different types of edge device service request patterns which usually change over time. Resources in the edge sites are typically shared by many users and by many applications or other services. The edge sites may also be resource-constrained. The edge sites work in conjunction with the core data center. To take full advantages of the resources available at edge sites, there is a need for techniques for dynamically promoting applications or other services with certain designated characteristics (e.g., applications and other services which are frequently requested, which require low latency, which would benefit from mitigating bandwidth costs, etc.) to edge sites. Further, there is a need for techniques for dynamically promoting applications or other services with other designated characteristics (e.g., time insensitive applications or other services, applications or other services requiring massive compute and/or storage resources, etc.) to the core data center.

In some embodiments, multiple characteristics or parameters (also referred to as criteria or factors) are combined and used to determine which applications or other services to promote to edge sites or the core data center. Such characteristics or parameters include: tolerable latency; bandwidth required; and request frequency. Applications and other services which require lower latency benefit from promotion to the edge sites, which avoids having to transmit data over potentially long distances to the core data center which introduces latency. Applications and other services running with heavy bandwidth costs would similarly benefit from promotion to the edge site, to reduce data transmission in the network. Applications and other services with frequent access requests, or which are predicted to have high amounts of access requests in the near future would also benefit from promotion to the edge sites to improve many edge device service qualities. These and potentially other characteristics and parameters associated with applications and other services are monitored at the edge sites and the core data center, to enable automatic tiering of the proper applications and other services between the core data center and the edge sites. For example, some embodiments may run an algorithm which promotes or otherwise migrates applications and other services from the edge sites to the core data center, and vice versa, based on scores assigned to each application or service based on the above-described characteristics of tolerable latency, bandwidth requirements and request frequency.

Figure 4:
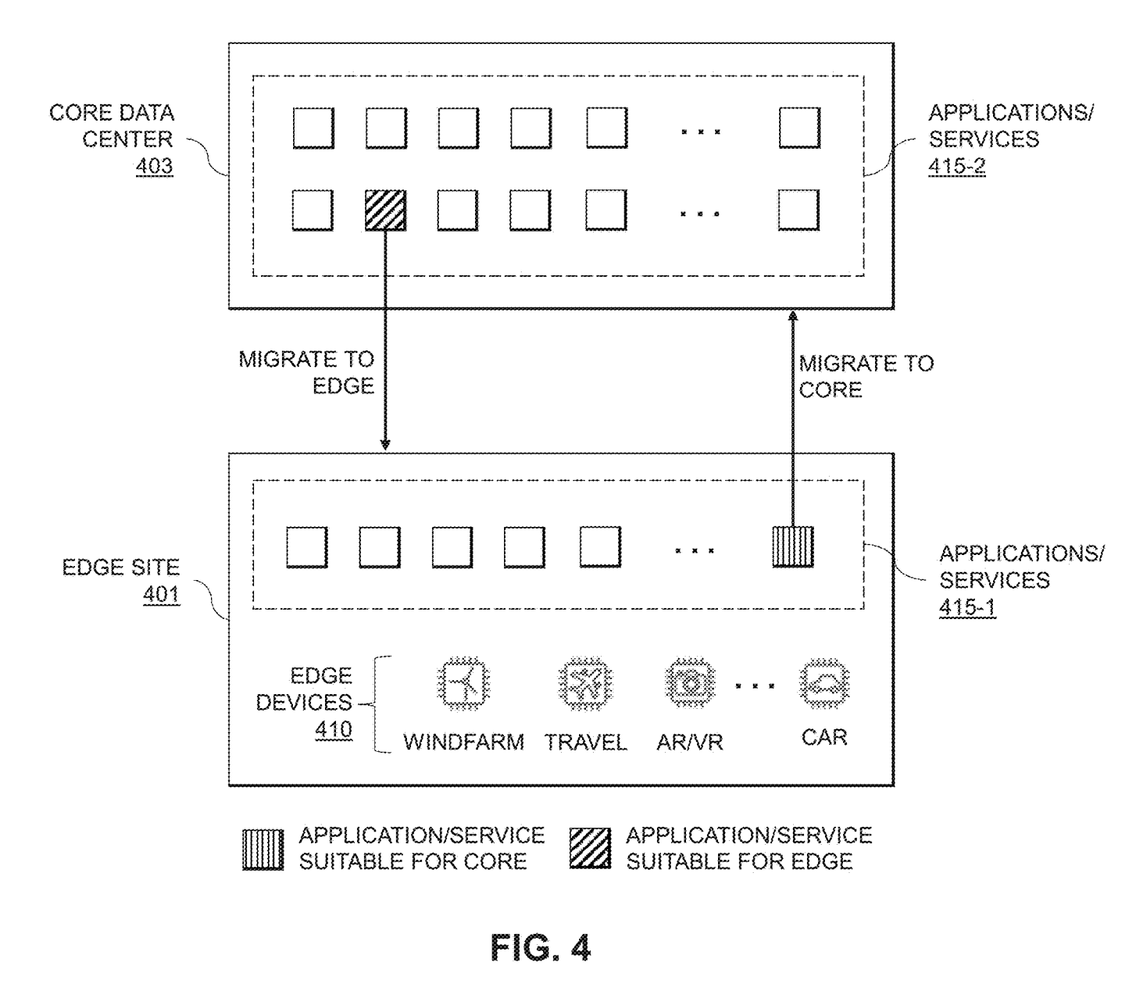
FIG. 4 shows an example of automatic tiering of applications and services between an edge computing site and a core data center in an illustrative embodiment.

FIG. 4 shows an example of dynamic promotion of applications and services between an edge site 401 including edge devices 410 (e.g., for a windfarm, travel, AR/VR, car, etc.) and a core data center 403. In each iteration, one or more applications or other services may be migrated from the edge site 401 to the core data center 403, and vice versa. As shown in FIG. 4, one of the applications and services 415-1 is migrated from the edge site 401 to the core data center 403, and one of the applications and services 415-2 is migrated from the core data center 403 to the edge site 401.

A detailed algorithm for automatic tiering of applications and other services between an edge site and a core data center will now be described. C denotes an application or other service relocation cycle. $A_i$ denotes a particular application or other service that sends access requests to the edge computing site, where i≤N, with N denoting the total number of applications or services sending requests to the edge computing site. K denotes the maximum number of applications and services which the edge site can handle. $L_i$ denotes the tolerable latency of the application or other service $A_i$, $B_i$ denotes the bandwidth requirement (also referred to as the bandwidth mitigation value) for the application or other service $A_i$, and $n_i$ denotes the request numbers for the application or other service $A_i$. $n_i$ may also be referred to as the "hot" level of the application or other service $A_i$.

The standardization of the latency parameter is represented as:

$$R_{Li} = \frac{\max(L) - L_i}{\max(L) - \min(L)}$$

This is a reverse indicator, where the application or other service $A_i$ for which the tolerable latency value is low should be promoted to the edge site, with i≤N and $0 \le R_{Li} \le 1$.

The standardization of the bandwidth requirement parameter is represented as:

$$R_{Bi} = \frac{B_i - \min(B)}{\max(B) - \min(B)}$$

This is a positive indicator, where the application or other service $A_i$ for which the bandwidth requirement value is high should be promoted to the edge site as it can benefit more from bandwidth mitigation, with i≤N and $0 \le R_{Li} \le 1$.

The standardization of the access frequency parameter is represented as:

$$R_{ni} = \frac{n_i - \min(n)}{\max(n) - \min(n)}$$

This is also a positive indicator, where the application or other service $A_i$ for which the access frequency value is high should be promoted to the edge site, with i≤N and $0 \le R_{ni} \le 1$.

The ratio of parameter j in all the parameters, j∈(L,B,n), is represented as:

$$p_{ji} = \frac{R_{ji}}{\sum_{i=1}^{N} R_{ji}}$$

The entropy of parameter j, j∈(L,B,n), is represented as:

$$e_j = -\frac{1}{\ln(N)} \sum_{i=1}^{N} p_{ji} \ln(p_{ji})$$

Entropy is the concept of information theory, and measures the uncertainty of the parameter A parameter j with a large entropy value has large uncertainty. If the uncertainty is large, the current information of parameter j is small, $0 \le e_j \le 1$.

The weights of the parameters L, B, n may be calculated according to:

$$w_j = \frac{1 - e_j}{\text{sum}(1 - e_j)}, j \in (L, B, n)$$

The above equation uses an entropy weight method (EWM), where a parameter j with a small entropy value means that the parameter has a high impact to the comprehensive evaluation and so it should have a high weight.

The comprehensive evaluation for an application or other service $A_i$ is represented as:

$$S_i = \text{sum}(w_j \cdot R_{ji}) = w_L \cdot R_{Li} + w_B \cdot R_{Bi} + w_n \cdot R_{ni}$$

As shown, the comprehensive evaluation or score $S_i$ for the application or other service $A_i$ may be computed as the weighted sum of the values for the latency, bandwidth mitigation and access request frequency parameters.

In an edge to core to cloud architecture (e.g., such as that described above in the context of FIG. 3), edge devices request services to the edge site and core data center. Assume that the edge devices in the edge site request a total of N applications or other services. For each application or service $A_i$, multiple criteria or parameters are evaluated to determine whether that application or service $A_i$ is more suitable for the edge site or the core data center. Such parameters in some embodiments include: (1) the tolerable latency of $A_i$ (e.g., which may be based on the type of business or other task performed by or using $A_i$), where the tolerable latency value for $A_i$ is denoted as $L_i$; (2) the bandwidth mitigation or bandwidth requirement of $A_i$ running on the edge site, where the bandwidth mitigation value for $A_i$ is denoted as $B_i$; and (3) the request number or access frequency of $A_i$ also referred to as the hot level of the specific application or service $A_i$, where the access frequency value of $A_i$ is denoted as $n_i$.

Combining these parameters (e.g., such as using a weighted sum of the values for each parameter), the application or service $A_i$ is scored to judge the suitability of running $A_i$ in the edge site. In some embodiments, an EWM is leveraged to calculate each parameter's weight. EWM provides a weighting method that measures value dispersion in decision-making. The greater the degree of dispersion, the greater the degree of differentiation, and more information can be derived and higher weight should be given to the parameter.

Figure 5:
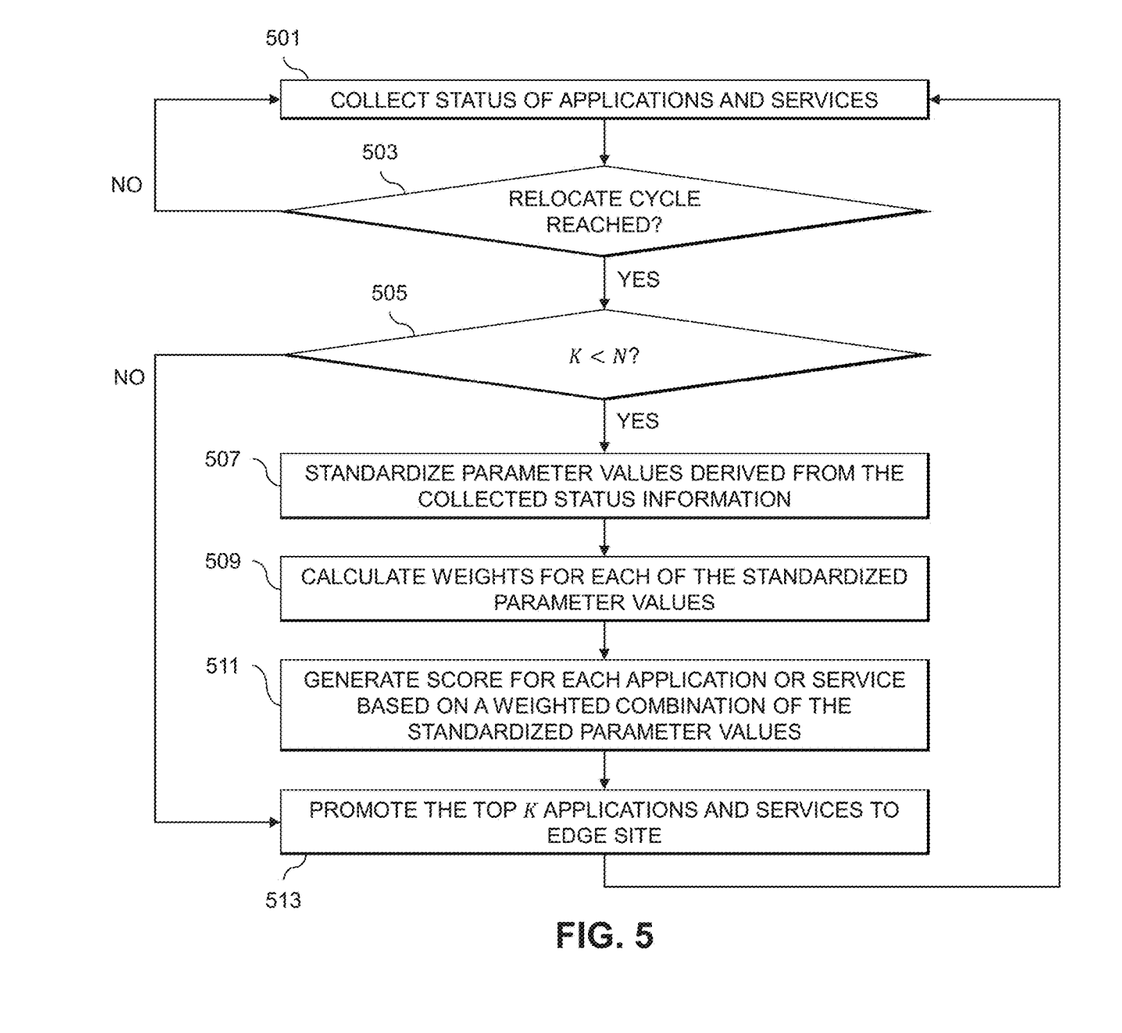
FIG. 5 shows a process flow for automated tiering of applications and services between an edge computing site and a core data center in an illustrative embodiment.

A process flow for automated tiering of applications and services between an edge computing site and a core data center will now be described with respect to FIG. 5. In step 501, the status of applications and other services are collected. Step 501 may be performed regularly (e.g., periodically, on user requests, etc.). Step 501 includes collecting information associated with each application or service $A_i$, where the collected information for an application or service $A_i$ includes a tolerable latency parameter value $L_i$, a bandwidth mitigation parameter value $B_i$, a request number parameter value $n_i$, the total number of applications and services N sending requests to the edge site devices, where the maximum number of applications and services which the edge site can handle being K. In step 503, a determination is made as to whether an application and service relocation cycle C has been reached. If the result of the step 503 determination is no, the FIG. 5 process flow returns to step 501. If the result of the step 503 determination is yes, the FIG. 5 process flow proceeds to step 505.

In step 505, a determination is made as to whether K<N. If K≥N, then the edge site can process all the applications and services sending requests to the edge site devices it is in charge of. This may happen when there is not many edge devices and associated applications and services active. In this scenario, all the applications and services can be promoted to the edge site (e.g., without requiring selection of K applications and services, as K in this scenario is less than or equal to N) and the FIG. 5 process flows to step 513. If K<N, then the edge site resources cannot handle all of the applications and services sending requests to the edge site devices. Thus, there is a need to choose the top K applications that should be promoted to the edge site. This scenario may be common when edge devices are increasing and active, and causes the FIG. 5 process flow to proceed to step 507.

In step 507, parameter values (e.g., derived from the collected status information from step 501 for the current relocation cycle C), are standardized. For each parameter, the unit of measurement may be different and thus there is a need to standardize the parameters to eliminate the effects of having different units of measurement. This standardization may include normalization to some designated range (e.g., between 0 and 1). The following equations may be used for standardizing the tolerable latency $L_i$, bandwidth mitigation $B_i$, and request number $n_i$ parameters:

$$R_{Li} = \frac{\max(L) - L_i}{\max(L) - \min(L)}$$

$$R_{Bi} = \frac{B_i - \min(B)}{\max(B) - \min(B)}$$

$$R_{ni} = \frac{n_i - \min(n)}{\max(n) - \min(n)}$$

$R_{Li}$ is a reverse indicator for the tolerable latency parameter $L_i$, as applications and services with lower tolerable latency parameter values are more suitable for promotion to the edge site. $R_{Bi}$ and $R_{ni}$ are positive indicators for the bandwidth mitigation parameter $B_i$ and the access request parameter $n_i$, respectively, where applications and services with higher bandwidth mitigation and access request number parameters are more suitable for promotion to the edge site. For each of the tolerable latency parameter $L_i$, the bandwidth mitigation parameter $B_i$ and the access request parameter $n_i$, the set of all applications and services are L, B, and n.

In step 509, weights for the different parameters are calculated. In some embodiments, an EWM is leveraged for calculating weights for the tolerable latency parameter $L_i$, the bandwidth mitigation parameter $B_i$ and the access request parameter $n_i$. The ratio of each parameter may be calculated according to the following equation:

$$p_{ji} = \frac{R_{ji}}{\sum_{i=1}^{N} R_{ji}}, j \in (L, B, n)$$

The entropy of each parameter may be calculated according to the following equation:

$$e_j = -\frac{1}{\ln(N)} \sum_{i=1}^{N} p_{ji} \ln(p_{ji}), j \in (L, B, n)$$

The weight of each parameter may be calculated using EWM according to the following equation:

$$w_j = \frac{1 - e_j}{\text{sum}(1 - e_j)}, j \in (L, B, n)$$

In step 511, a score is generated for each application or service, based on a weighted combination of the standardized parameter values. The score for an application or service $A_i$ is denoted as $S_i$, and may be calculated according to the following equation:

$$S_i = \text{sum}(w_j \cdot R_{ji}) = w_L \cdot R_{Li} + w_B \cdot R_{Bi} + w_n \cdot R_{ni}, (i = 1, \ldots, N)$$

In step 513, the top K applications or services are promoted to the edge site. The top K applications and services may be those applications and services with the K highest scores from step 511. The set of scores for all applications and services may be denoted as $S = [S_1, S_2, \ldots, S_N]$. S may be sorted in reverse order (e.g., from high values to low values):

$$S = \text{sort}(S, \text{descend})$$

The top K applications and services most suitable for promotion to the edge site (e.g., the top K applications and services that would benefit the most from promotion to the edge site) are determined by taking the top K of the sorted S. The other applications and services are promoted to the core data center. The FIG. 5 process may then return to step 501 to wait for a next application and service relocation cycle.

Figure 6A:
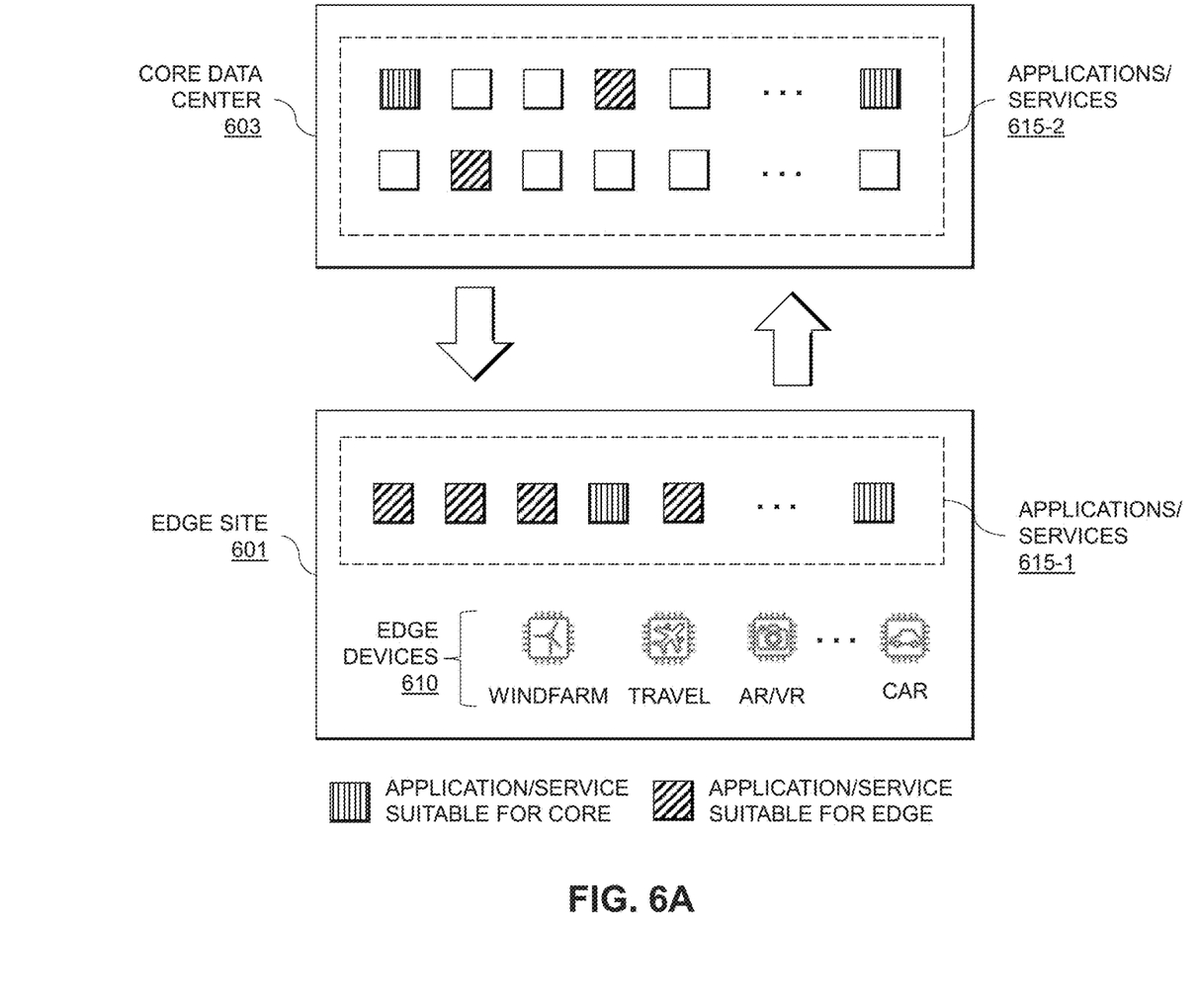
FIGS. 6A and 6B show an edge computing site and a core data center before and after automatic tiering of the applications and services between the edge computing site and the core data center in an illustrative embodiment.
Figure 6B:
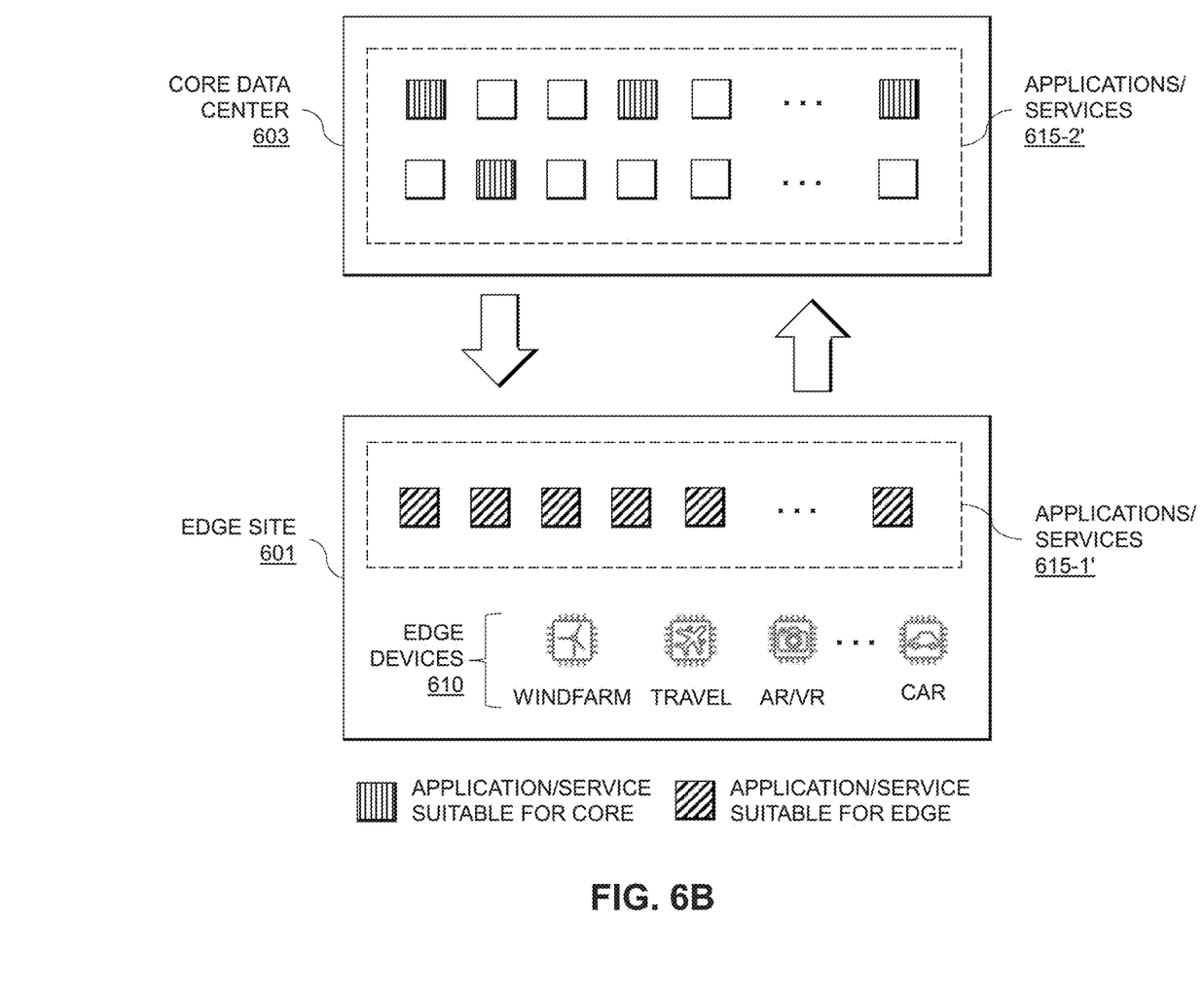

FIGS. 6A and 6B illustrate dynamic promotion of applications and services between an edge site 601 including edge devices 610 (e.g., for a windfarm, travel, AR/VR, car, etc.) and a core data center 603 for a given relocation cycle. FIG. 6A shows the environment prior to relocation, where some of the applications and services 615-1 at the edge site 601 are considered more suitable for running in the core data center 603, and where some of the applications services 615-2 at the core data center are considered more suitable for running in the edge site 601. The suitability of the different applications and services (e.g., whether they are more suitable for running at the edge site 601 or the core data center 603) may be determined using scores generated for the different applications and services 615-1 and 615-2 using the FIG. 5 process flow. FIG. 6B shows the environment after relocation, where the applications and services 615-1' at the edge site 601 include those more suitable for running at the edge site 601 and the applications and services 615-2' at the core data center 603 include those more suitable for running at the core data center 603. Although in this embodiment the edge site 601 has capacity for running all of the applications and services deemed more suitable for running at the edge site 601 (e.g., an example where K<N) this is not a requirement. In other embodiments (e.g., where K≥N), only some of the applications and services deemed more suitable for running at the edge site 601 may be promoted to the edge site 601 (e.g., those applications services with the top K scores).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated service tiering between edge computing sites and a core data center will now be described in greater detail with reference to FIGS. 7 and 8. Although described in the context of system 100, these platforms may also be used to implement at least portions of other information processing systems in other embodiments.

Figure 7:
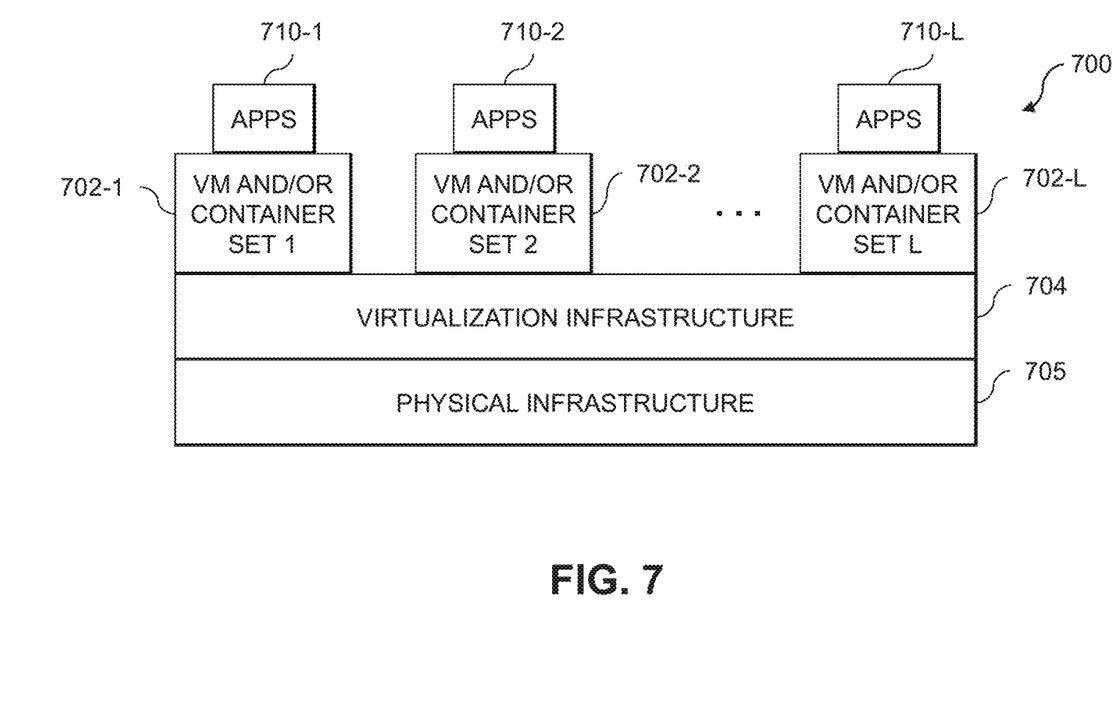
FIGS. 7 and 8 show examples of processing platforms that may be utilized to implement at least a portion of an information processing system in illustrative embodiments.
Figure 8:
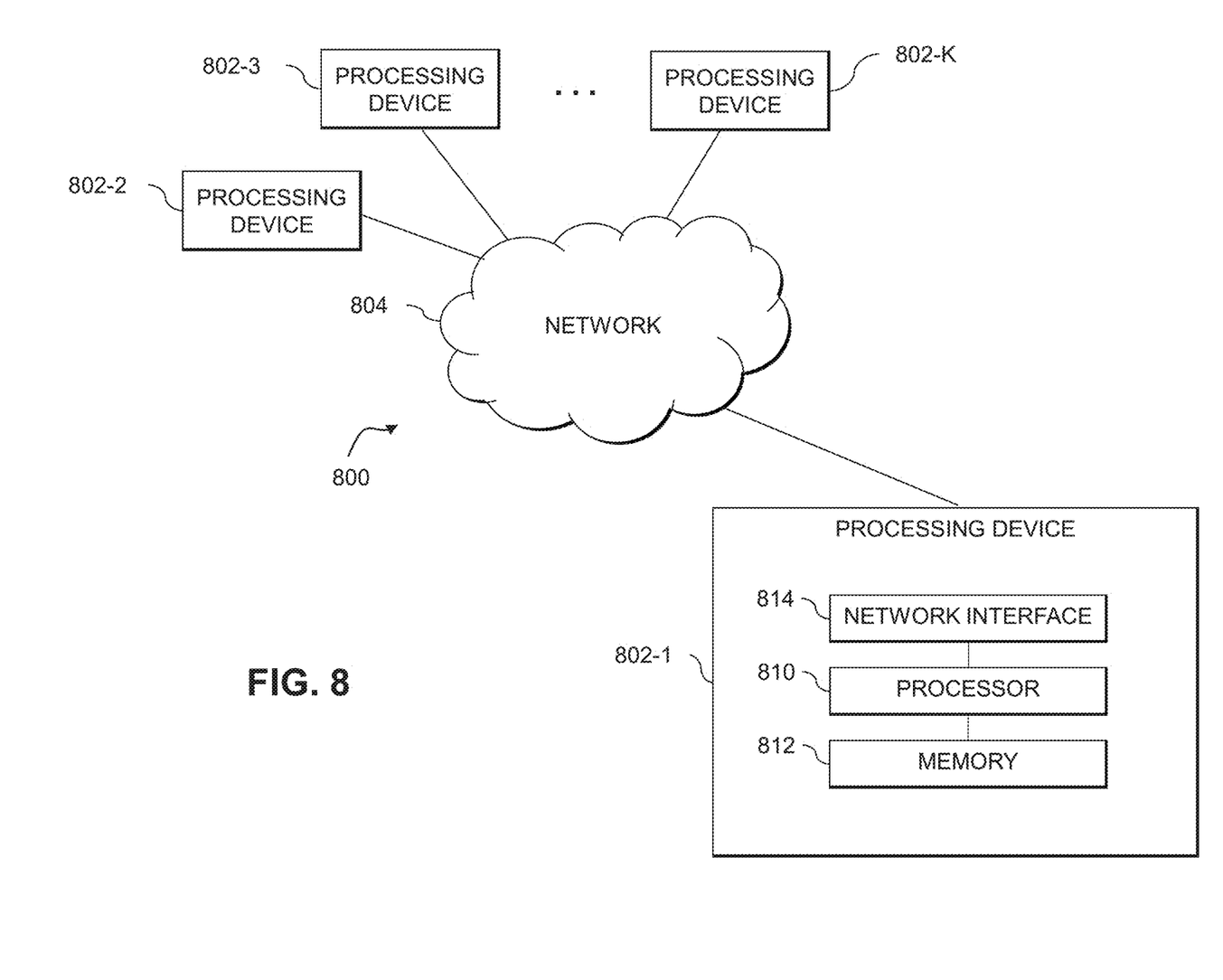

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated service tiering between edge computing sites and a core data center as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, services, parameters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
  at least one processing device comprising a processor coupled to a memory;
  the at least one processing device being configured to perform steps of:
    obtaining information associated with a plurality of services hosted in an information technology infrastructure, the information technology infrastructure comprising at least one core data center hosting a first subset of the plurality of services and one or more edge computing sites hosting a second subset of the plurality of services;
    determining, based at least in part on the obtained information, values associated with two or more parameters characterizing suitability of hosting respective ones of the plurality of services at the one or more edge computing sites;

generating, based at least in part on the determined values associated with the two or more parameters characterizing suitability of hosting respective ones of the plurality of services at the one or more edge computing sites, scores for each of the plurality of services;

identifying, based at least in part on the generated scores for the plurality of services, at least a given one of the plurality of services to be migrated, wherein the given one of the plurality of services to be migrated comprises one of: one of the first subset of the plurality of services to be migrated from the at least one core data center to at least one of the one or more edge computing sites; and one of the second subset of the plurality of services to be migrated from the one or more edge computing sites to the at least one core data center; and migrating the given one of the plurality of services.

2. The apparatus of claim 1 wherein the two or more parameters characterizing suitability of hosting respective ones of the plurality of services at the one or more edge computing sites comprise at least one parameter characterizing tolerable latency for respective ones of the plurality of services.

3. The apparatus of claim 1 wherein the two or more parameters characterizing suitability of hosting respective ones of the plurality of services at the one or more edge computing sites comprise at least one parameter characterizing bandwidth requirements for respective ones of the plurality of services.

4. The apparatus of claim 1 wherein the two or more parameters characterizing suitability of hosting respective ones of the plurality of services at the one or more edge computing sites comprise at least one parameter characterizing numbers of access requests for respective ones of the plurality of services.

5. The apparatus of claim 1 wherein identifying the given one of the plurality of services to be migrated comprises:

determining available resources at the one or more edge computing sites; and identifying, based at least in part on the determined available resources, a maximum number of the plurality of services that can be concurrently hosted at the one or more edge computing sites.

6. The apparatus of claim 5 wherein identifying the given one of the plurality of services to be migrated further comprises:

determining whether a total number of the plurality of services receiving access requests in a first service relocation cycle is less than or equal to the maximum number of the plurality of services that can be concurrently hosted at the one or more edge computing sites;

hosting, for a second service relocation cycle subsequent to the first service relocation cycle, all of the plurality of services at the one or more edge computing sites responsive to determining that the total number of the plurality of services receiving access requests in the first service relocation cycle is less than or equal to the maximum number of the plurality of services that can be concurrently hosted at the one or more edge computing sites; and hosting, for the second service relocation cycle, a selected subset of the plurality of services at the one or more edge computing sites responsive to determining that the total number of the plurality of services receiving access requests in the first service relocation cycle is greater than the maximum number of the plurality of services that can be concurrently hosted at the one or more edge computing sites.

7. The apparatus of claim 1 wherein generating the scores for each of the plurality of services comprises standardizing values of each of the two or more parameters.

8. The apparatus of claim 7 wherein standardizing the values of each of the two or more parameters comprises, for a given one of the two or more parameters, normalizing values for the given parameter to a designated value range.

9. The apparatus of claim 7 wherein generating the scores for each of the plurality of services further comprises calculating weights for each of the two or more parameters.

10. The apparatus of claim 9 wherein calculating the weights for each of the two or more parameters comprises utilizing an entropy weighting method.

11. The apparatus of claim 9 wherein generating the scores for each of the plurality of services comprises, for the given one of the plurality of services, generating a given score as a weighted combination of the standardized values of the two or more parameters for the given one of the plurality of services.

12. The apparatus of claim 1 wherein the at least one core data center is geographically remote from the one or more edge computing sites.

13. The apparatus of claim 1 wherein at least one of the one or more edge computing sites stores an image for the given one of the plurality of services, the image for the given one of the plurality of services comprising at least one of a virtual machine image and a software container image.

14. The apparatus of claim 13 wherein migrating the given one of the plurality of services comprises migrating the given one of the plurality of services from the at least one data center to said at least one of the one or more edge computing sites by instantiating at least one of a virtual machine instance and a software container instance utilizing the image stored by said at least one of the one or more edge computing sites.

15. A computer program product comprising a non-transitory processor-readable storage medium having stored therein program code of one or more software programs, wherein the program code when executed by at least one processing device causes the at least one processing device to perform steps of:

obtaining information associated with a plurality of services hosted in an information technology infrastructure, the information technology infrastructure comprising at least one core data center hosting a first subset of the plurality of services and one or more edge computing sites hosting a second subset of the plurality of services;

determining, based at least in part on the obtained information, values associated with two or more parameters characterizing suitability of hosting respective ones of the plurality of services at the one or more edge computing sites;

generating, based at least in part on the determined values associated with the two or more parameters characterizing suitability of hosting respective ones of the plurality of services at the one or more edge computing sites, scores for each of the plurality of services;

identifying, based at least in part on the generated scores for the plurality of services, at least a given one of the plurality of services to be migrated, wherein the given one of the plurality of services to be migrated comprises one of: one of the first subset of the plurality of services to be migrated from the at least one core data center to at least one of the one or more edge computing sites; and one of the second subset of the plurality of services to be migrated from the one or more edge computing sites to the at least one core data center; and migrating the given one of the plurality of services.

16. The computer program product of claim 15 wherein the two or more parameters characterizing suitability of hosting respective ones of the plurality of services at the one or more edge computing sites comprise at least two of:
   at least one parameter characterizing tolerable latency for respective ones of the plurality of services;
   at least one parameter characterizing bandwidth requirements for respective ones of the plurality of services; and
   at least one parameter characterizing numbers of access requests for respective ones of the plurality of services.

17. The computer program product of claim 15 wherein at least one of the one or more edge computing sites stores an image for the given one of the plurality of services, the image for the given one of the plurality of services comprising at least one of a virtual machine image and a software container image, and wherein migrating the given one of the plurality of services comprises migrating the given one of the plurality of services from the at least one data center to said at least one of the one or more edge computing sites by instantiating at least one of a virtual machine instance and a software container instance utilizing the image stored by said at least one of the one or more edge computing sites.

18. A method comprising:
   obtaining information associated with a plurality of services hosted in an information technology infrastructure, the information technology infrastructure comprising at least one core data center hosting a first subset of the plurality of services and one or more edge computing sites hosting a second subset of the plurality of services;
   determining, based at least in part on the obtained information, values associated with two or more parameters characterizing suitability of hosting respective ones of the plurality of services at the one or more edge computing sites;
   generating, based at least in part on the determined values associated with the two or more parameters characterizing suitability of hosting respective ones of the plurality of services at the one or more edge computing sites, scores for each of the plurality of services;
   identifying, based at least in part on the generated scores for the plurality of services, at least a given one of the plurality of services to be migrated, wherein the given one of the plurality of services to be migrated comprises one of: one of the first subset of the plurality of services to be migrated from the at least one core data center to at least one of the one or more edge computing sites; and one of the second subset of the plurality of services to be migrated from the one or more edge computing sites to the at least one core data center; and
   migrating the given one of the plurality of services;
   wherein the method is performed by at least one processing device comprising a processor coupled to a memory.

19. The method of claim 18 wherein the two or more parameters characterizing suitability of hosting respective ones of the plurality of services at the one or more edge computing sites comprise at least two of:
   at least one parameter characterizing tolerable latency for respective ones of the plurality of services;
   at least one parameter characterizing bandwidth requirements for respective ones of the plurality of services; and
   at least one parameter characterizing numbers of access requests for respective ones of the plurality of services.

20. The method of claim 18 wherein at least one of the one or more edge computing sites stores an image for the given one of the plurality of services, the image for the given one of the plurality of services comprising at least one of a virtual machine image and a software container image, and wherein migrating the given one of the plurality of services comprises migrating the given one of the plurality of services from the at least one data center to said at least one of the one or more edge computing sites by instantiating at least one of a virtual machine instance and a software container instance utilizing the image stored by said at least one of the one or more edge computing sites.

* * * * *